(12) United States Patent
Peterson et al.

(10) Patent No.: US 6,923,490 B2
(45) Date of Patent: Aug. 2, 2005

(54) SLIDABLE SUN VISOR ASSEMBLY

(75) Inventors: Donald M. Peterson, W. Bloomfield, MI (US); Von Gallaher, Rochester, MI (US); James B. Cook, Bois-le-Roi (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/350,514

(22) Filed: Jan. 24, 2003

(65) Prior Publication Data
US 2004/0145209 A1 Jul. 29, 2004

(51) Int. Cl.$^7$ .................................................. B60J 3/00
(52) U.S. Cl. .................. 296/97.11; 296/97.1; 296/97.4
(58) Field of Search ............................. 296/97.1, 97.4, 296/97.8, 97.11

(56) References Cited

U.S. PATENT DOCUMENTS

| | | | | |
|---|---|---|---|---|
| 4,582,356 A | * | 4/1986 | Kaiser et al. | 296/97.11 |
| 4,762,359 A | | 8/1988 | Boerema et al. | 296/97.1 |
| 4,921,300 A | * | 5/1990 | Lawassani et al. | 296/97.11 |
| 4,925,233 A | * | 5/1990 | Clark | 296/97.11 |
| 4,998,765 A | | 3/1991 | Van Order et al. | 296/97.11 |
| 5,007,532 A | * | 4/1991 | Binish | 296/97.1 |
| 5,409,285 A | | 4/1995 | Snyder et al. | 296/97.11 |
| 5,556,154 A | * | 9/1996 | Vaxelaire | 296/97.1 |
| 5,871,252 A | | 2/1999 | Gute | 296/97.11 |
| 5,887,933 A | * | 3/1999 | Peterson | 296/97.1 |
| 5,934,734 A | | 8/1999 | Wilson | 296/97.11 |
| 5,984,398 A | * | 11/1999 | Crotty, III | 296/97.1 |
| 6,131,985 A | * | 10/2000 | Twietmeyer et al. | 296/97.1 |
| 6,220,644 B1 | | 4/2001 | Tiesler et al. | |
| 6,619,718 B1 | * | 9/2003 | Tiesler | 296/97.1 |
| 6,692,059 B1 | * | 2/2004 | Mills | 296/97.1 |
| 2001/0024048 A1 | * | 9/2001 | Hobson et al. | 296/97.1 |

FOREIGN PATENT DOCUMENTS

| | | | | |
|---|---|---|---|---|
| DE | 3324305 A1 | * | 1/1985 | 296/97.11 |
| EP | 231440 A2 | * | 8/1987 | 296/97.11 |
| JP | 05286362 A | * | 11/1993 | 296/97.11 |

* cited by examiner

Primary Examiner—Lori L. Coletta
(74) Attorney, Agent, or Firm—MacMillan, Sobanski & Todd, LLC

(57) ABSTRACT

An improved sliding sun visor assembly for a vehicle includes a visor body. The visor body has an inner surface which defines a first frictional engagement surface. A visor arm is provided and has a first end attachable to a portion of the vehicle, and a second end. A detent clip is disposed about the second end of the visor arm. A detent member receives the detent clip and has an outer surface which defines a second frictional engagement surface. The second frictional engagement surface is selectively engaged with the first frictional engagement surface.

18 Claims, 4 Drawing Sheets

SLIDABLE SUN VISOR ASSEMBLY

BACKGROUND OF THE INVENTION

The present invention relates to sun visors mounted in vehicles and more particularly to an improved sliding sun visor assembly.

When driving a vehicle it is desirable to shield an occupant's eyes from glaring sunlight which enters the vehicle interior through the windshield or the side windows. As a result, vehicle interiors are usually equipped with sun visors. Typically, a sun visor slides adjacent the vehicle windshield or side window to provide different areas of effective sun blocking protection. Such slidable sun visors must minimize the slide effort of the visor, while still controlling lateral play and flutter, during operation of the vehicle. Such slidable visors often include metal to metal, or metal to plastic contact between the mating surfaces of the sliding components within the visor assembly. The sliding frictional engagement between such components can increase the effort needed to slide the visor, and cause undesirable wear between the components. Therefore, it would be advantageous to provide an improved sliding sun visor assembly.

SUMMARY OF THE INVENTION

This invention relates to an improved sliding sun visor assembly for a vehicle. The visor assembly includes a visor body. The visor body has an inner surface which defines a first frictional engagement surface. A visor arm is provided and has a first end attachable to a portion of the vehicle, and a second end. A detent clip is disposed about the second end of the visor arm. A detent member receives the detent clip and has an outer surface which defines a second frictional engagement surface. The second frictional engagement surface is selectively engaged with the first frictional engagement surface.

Various objects and advantages of this invention will become apparent to those skilled in the art from the following detailed description of the preferred embodiment, when read in light of the accompanying drawings.

DETAILED DESCRIPTION OF THE INVENTION

Figure 1:
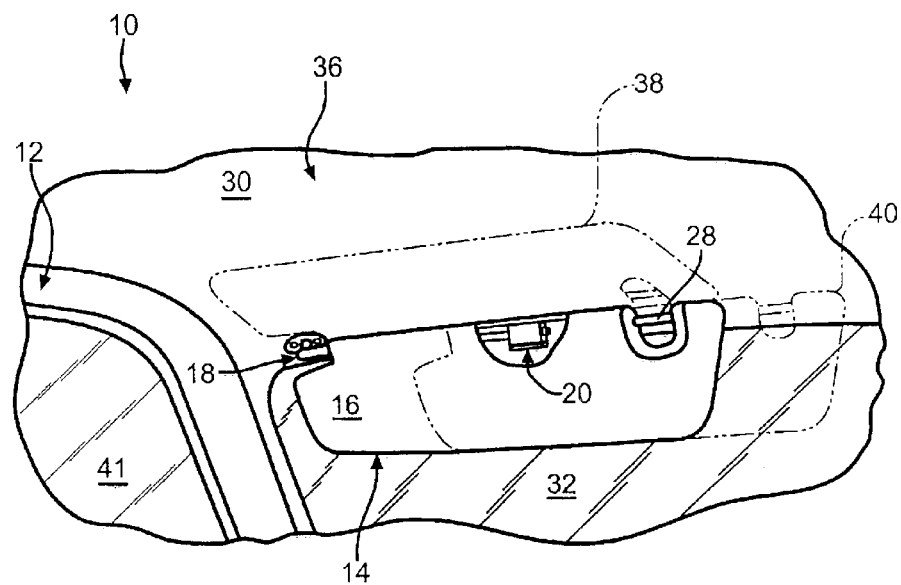
FIG. 1 is a perspective view, partially cut-away, of a visor assembly according to the invention, showing the visor assembly in a retracted and deployed position within a vehicle, with the retracted and stowed position and the extended and deployed positions shown in phantom line.
Figure 2:
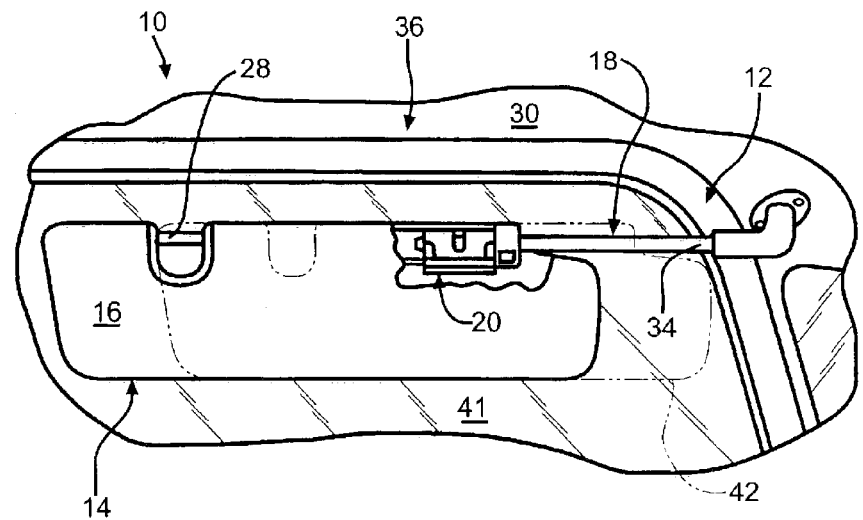
FIG. 2 is a perspective view, partially cut-away, of the visor assembly illustrated in FIG. 1 showing the visor assembly in a deployed and extended position against a side window of a vehicle, with the deployed and retracted position shown in phantom line.

As illustrated in FIGS. 1 and 2, there is generally shown at 10 a slidable sun visor assembly according to the invention. The sun visor assembly 10 is pivotally mounted within a vehicle 12, and includes a visor body 14, a cover 16, a visor arm 18, and a detent clip assembly 20, as will be described in detail herein. The body 14, which preferably comprises a thermoplastic such as polypropylene, has a substantially clamshell configuration. The body 14 includes first and second halves 22 and 24, respectively, defined by a hinge 26. The cover 16 can be of any desired material, such as a foam backed cloth or vinyl, and is disposed around the visor body 14 to cover the outer sides of the first and second halves 22 and 24. An example of such a visor body 14 is disclosed in U.S. Pat. No. 5,887,933 to Peterson, and is incorporated herein by reference.

The sun visor assembly 10 can also include a support pin 28. Preferably, the support pin 28 is detachably mounted in a mounting recess of a mount (not shown), which is fastened to the body of the vehicle 12, preferably through a headliner 30, as is well known in the art. The support pin 28 is preferably arranged in line with the visor arm 18 to form a common rotational axis for the visor assembly 10 between a stowed position adjacent the headliner, and a deployed position adjacent a vehicle windshield 32, as will be described in detail herein.

FIGS. 1 and 2 show a first end 34 of the visor arm 18 mounted to a roof 36 through the headliner 30 of the vehicle 12. In FIG. 1, the visor assembly 10 is shown in a retracted and deployed position abutting against the windshield 32. The visor assembly 10 can be rotated between the retracted and deployed position, and a retracted and stowed position adjacent the vehicle headliner 30, as illustrated by phantom line 38. A phantom line 40 further illustrates the visor assembly 10 in an extended and deployed position. In the extended and deployed position, the support pin 28 of the visor assembly 10 is detached from the mount to allow the visor body 14 to be telescopically extended relative to the visor arm 18 so as to provide optimum sun blocking.

The visor assembly 10 can be also be pivoted in the retracted and deployed position 42 to a position adjacent a vehicle window, such as a side window 41, as illustrated in FIG. 2. As further shown in FIG. 2, the visor assembly 10 can be moved between the retracted and deployed position 42, and the extended and deployed position when adjacent the side window 41. Although not illustrated, it will be understood that the visor assembly 10 can also be mounted on the passenger's side of the vehicle 12.

Figure 3:
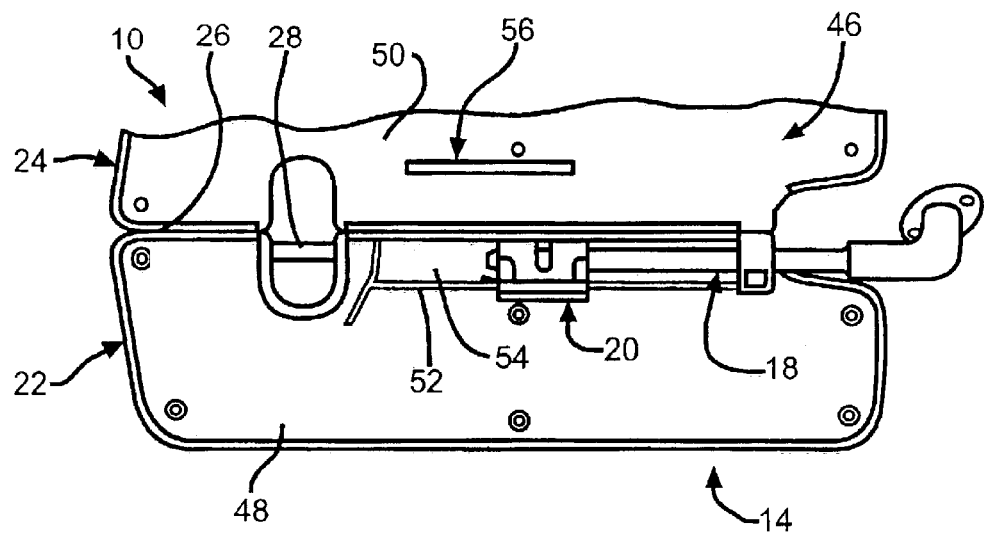
FIG. 3 is a partial plan view of the visor body illustrated in FIG. 1, in an open, unsealed condition.

As shown in FIG. 3, the visor assembly 10 includes the visor body 14 and the detent clip assembly 20. An inner surface of the visor body 14 defines a slide path or first frictional engagement surface 46. The first frictional engagement surface 46 includes a first-half portion 48 and a second-half portion 50. Preferably, the first-half portion 48 of the first frictional engagement surface 46 includes an outwardly extending track 52 and a first-half surface portion 54. The second-half portion 50 preferably includes at least one outwardly extending hook 56. The hook 56 includes a housing contact surface 58 and defines a rib channel 60.

The detent clip assembly 20 includes a detent clip 62, a substantially rectangular detent member or housing 64, and the visor arm 18. Preferably, the detent clip 62 is disposed about a second end 66 of the visor arm 18, as shown in FIG. 4.

Figure 4:
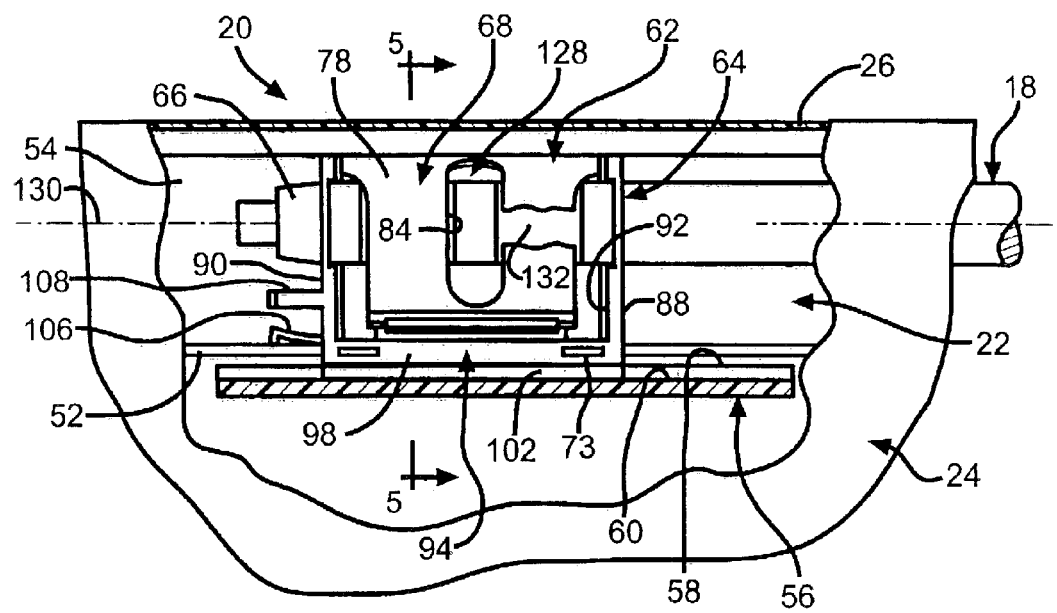
FIG. 4 is an enlarged plan view of the detent clip assembly illustrated in FIG. 2.
Figure 5:
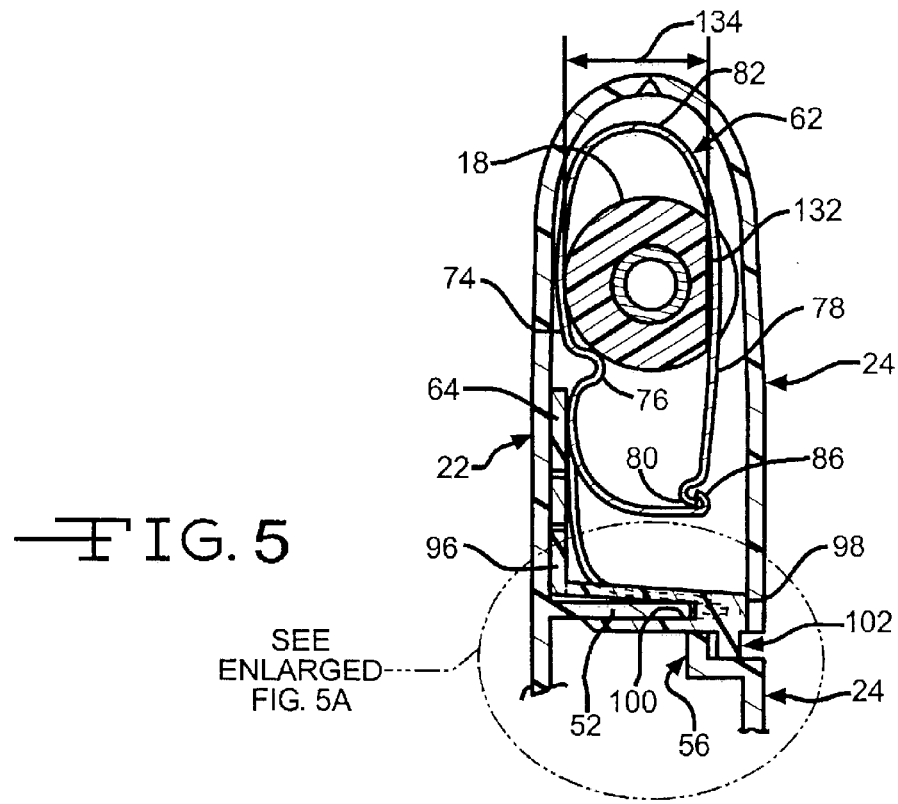
FIG. 5 is a cross sectional side view of the detent clip assembly taken along line 5—5 of FIG. 4.
Figure 5A:
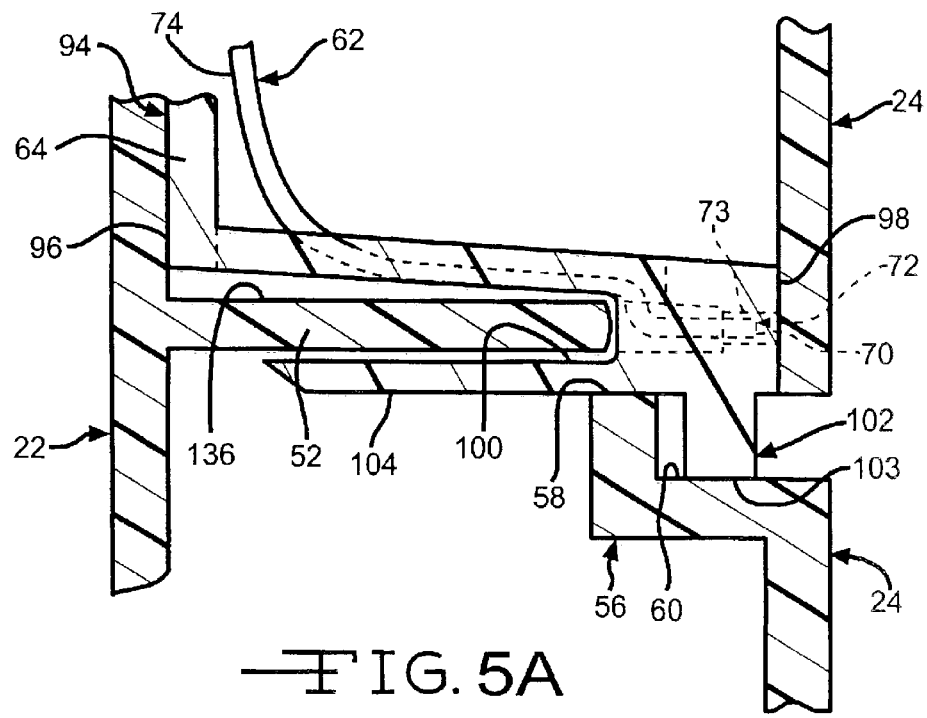
FIG. 5A is an enlarged cross sectional side view of the track and track channel illustrated in FIG. 5.

As best shown in FIGS. 4, 5, and 5A, the detent clip 62 includes a generally elongated clip body 68. The clip body 68 includes a first portion or edge 70. At least one mounting tab 72 extends outwardly from the first edge 70. The detent clip 62 further includes a first side 74 having an inwardly bent central portion 76, (as viewed in FIG. 5), a second side 78 terminating in an outwardly bent second portion or edge 80, and a shoulder portion 82 between the first side 74 and the second side 78. If desired, the second side 78 can include an aperture 84 formed therethrough. At least one third or locking portion 86 extends from the first side 74 toward the second side 78. Preferably, the locking portion 86 engages the second edge 80, such that the locking portion 86 and the second edge 80 are coupled to one another.

Preferably, the locking portion 86 is integrally formed with the detent clip 62 during a conventional stamping process, although such is not required. The locking portion 86 can also be separately formed and attached to the detent clip 62 by any desired method, such as welding. The detent clip 62 is preferably formed from a substantially rigid material, such as steel, although the detent clip 62 can also be formed from any other desired material. More preferably, the detent clip 62 is formed from spring steel.

As best shown in FIG. 5A, the mounting tab 72 is preferably disposed within a slot 73 of a substantially rectangular detent member or housing 64, thereby attaching the detent clip 62 to the housing 64. The detent clip 62 can also be attached to the housing 64 by any other desired method. For example, the detent clip 62 can be integrally molded into the housing 64.

Figure 6:
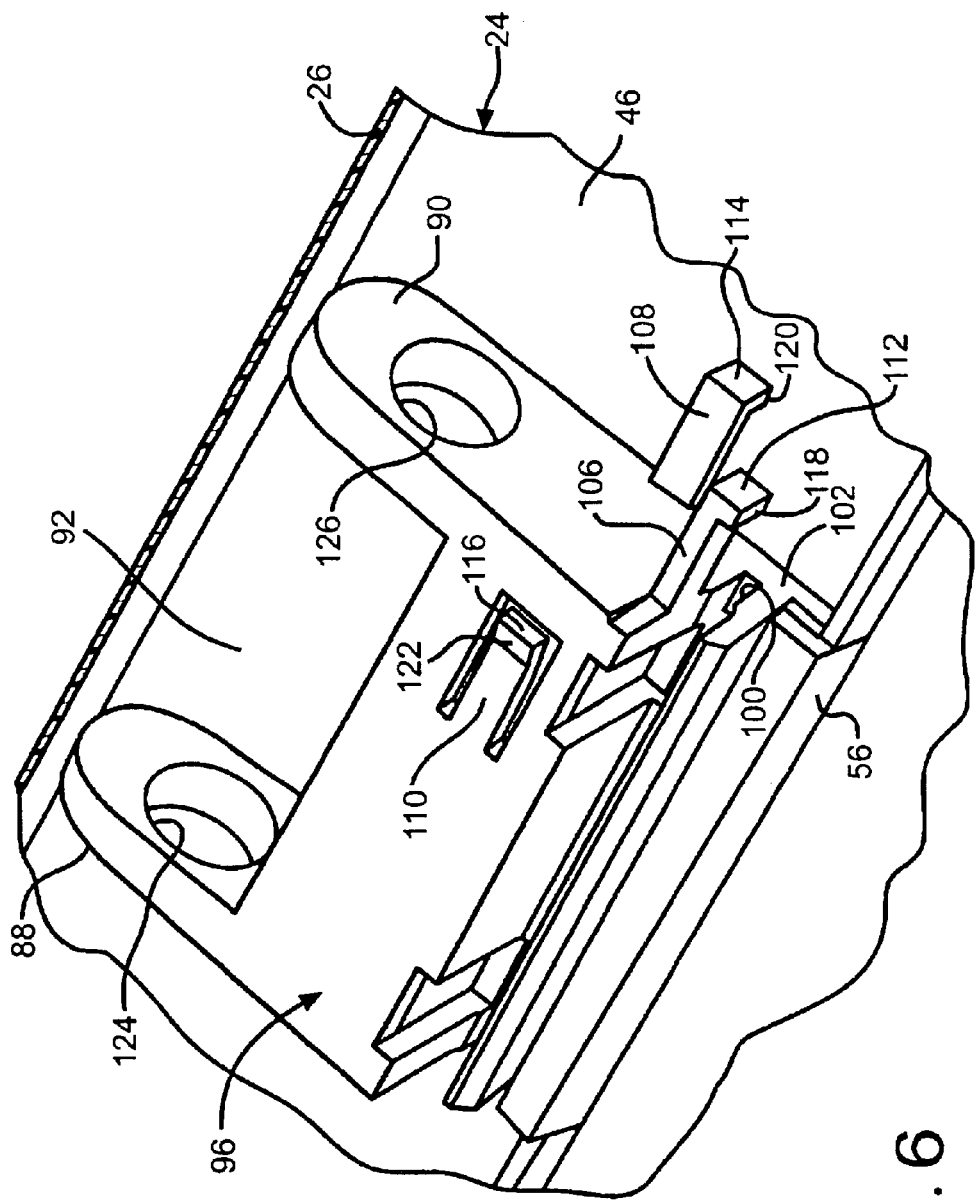
FIG. 6 is an enlarged perspective view of the detent clip assembly housing illustrated in FIGS. 1 through 5.

As shown in FIGS. 4 and 6, the housing 64 includes opposing first and second end walls 88 and 90, and defines a cavity 92 for receiving the detent clip 62. An outer surface of the housing 64 defines a second frictional engagement surface 94. The second frictional engagement surface 94 includes a first-half engaging portion 96 and a second-half engaging portion 98.

Preferably, the first-half engaging portion 96 of the second frictional engagement surface 94 includes a track channel 100, as shown in FIG. 6. When the visor assembly 10 is assembled, the track 52 is disposed within and frictionally engages the track channel 100. A rib 102 includes a hook contacting surface 103 and preferably extends outwardly from an outer wall 104 of the housing 64 adjacent the track channel 100.

As shown in FIGS. 4 and 6, a plurality of substantially resilient fingers extends outwardly from the housing 64. Preferably, a track-engaging finger 106 and a second-half engaging finger 108 extend outwardly from the second end wall 90. A first-half engaging finger 110 can also be formed in the first-half engaging portion 96. A distal end 112, 114, and 116 of each finger 106, 108, and 110, respectively, is preferably L-shaped. Each distal end 112, 114, and 116 includes a respective contact surface 118, 120, and 122, the purpose of which will be explained in detail herein.

The housing 64 can be formed of any desired material. A thermoplastic polymer such as polypropylene is a preferred material for the housing due its relative strength, rigidity, and coefficient of sliding friction, although such is not required.

When disposed in the housing 64, as shown in FIG. 4, the detent clip 62 and openings 124 and 126 formed in the first and second end walls 88 and 90, respectively, of the housing 64 define a passageway 128 for receiving the visor arm 18. The visor arm 18 has a substantially cylindrical outer surface, and the first end is preferably substantially L-shaped. The first end 34 is preferably mounted to the roof 36 and/or headliner 30 of the vehicle in any desired manner. Preferably, the first end 34 is mounted within a mounting recess of a mounting bracket (not shown) fastened to the body of the vehicle 12 through the headliner 30.

The second end 66 of the visor arm 18 extends through the passageway 128, and has an axis 130 about which the visor body 14 can rotate. At least one substantially flat recessed surface 132 is formed at the second end 66 of the visor arm 18. The embodiment illustrated in FIG. 4 includes two recessed surfaces 132, however, any desired number of flat recessed surfaces 132 can be provided. The flat recessed surfaces 132 can also extend any desired distance on the visor arm 18. The flat recessed surfaces 132 define a detent portion of the visor arm 18.

During operation, the detent clip 62 provides a clamping force on the visor arm 18. The smallest clamping force on the visor arm 18 occurs when the second side 78 of the detent clip 62 clamps against the flat recessed surfaces 132, such as when the visor assembly 10 is in the stowed position. As shown in FIG. 5, a first distance 134 thereby separates the first side 74 and the second side 78 of the detent clip 62. This minimal clamping force allows the detent clip assembly 20 to be readily rotated from the stowed position by a vehicle passenger. When the visor assembly 10 is in the deployed position, the flat recessed surfaces 132 are rotated away from contact with the detent clip 62, such that the detent clip assembly 20 grasps the visor arm 18 with a maximum clamping force. Accordingly, the detent clip assembly 20 seeks to snap into a stable, lower clamping force position such as provided in the stowed position. Additional flat recessed surfaces can also be provided on the second end 66 of the visor arm 18 such that the minimum clamping force also occurs with the visor assembly 10 is in the deployed position. Such clamping forces substantially eliminate flutter or backlash that can occur between the visor body 14 and the visor arm 18.

For example, the rotational movement of the visor body 14 about the visor arm 18 causes the visor body 14 to move between the stowed position wherein the second side 78 of the detent clip 62 contacts the recessed surfaces 132 of the visor arm 18, as shown in FIG. 5, and the deployed position wherein the recessed surfaces 132 do not contact the detent clip 62.

When in the stowed position, the detent clip assembly 20 exerts a force or load which urges the housing 64 against the first-half 22 of the visor body 14. To distribute a portion of the load exerted by the housing 64 on the visor body 14 to the second-half 24 of the visor body 14, the hook contact surface 103 of the rib 102 engages the hook 56 and the housing contact surface 58 of the hook 56 engages the housing 64. A portion of the load exerted by the housing 64 is thereby distributed between both the first-half 22 and the second-half 24 of the visor body 14.

Such distribution of the load generated by the housing 64 prevents the load from being applied to only one half of the visor body 14, and substantially eliminates distortion and deformation of the visor body 14. By substantially eliminating distortion and deformation of the visor body 14, any flutter or backlash that may occur between the visor body 14 and the visor arm 18 is also substantially eliminated.

During lateral movement of the visor body 14, as shown in FIGS. 1 and 2, the visor body 14 is moved between the retracted position and the extended position. During such lateral movement of the visor body 14, the track 52 frictionally engages the track channel 100, and the housing 64 slides within the visor body 14 between the track 52, first-half surface portion 54, and the second-half portion 50.

Additionally, during lateral movement of the visor body 14, a force is exerted on the visor body 14 and the housing 64 such that the visor body 14 and the housing 64 are pressed together. Each of the visor body 14 and the housing 64 are made of a material such that a desired coefficient of sliding friction is achieved when the housing 64 slides relative to the visor body 14. A thermoplastic polymer such as polypropylene is a preferred material for the visor body 14 and the housing 64, although the visor body 14 and the housing 64 can be made of any desired material.

Each finger 106, 108, and 110 provides an additional force which urges the housing 64 away from one the visor body 14. For example, the contact surfaces 118, 120, and 122 of the fingers 106, 108, and 110, respectively, engage the first frictional engagement surface 46 of the housing 64. Specifically, the contact surface 122 of the first-half engaging finger 110 engages the first-half surface portion 54, the contact surface 118 of the track-engaging finger 106 engages a side surface 136 of the track 52, and the contact surface 120 of the second-half engaging finger 108 engages the second-half portion 46.

The principle and mode of operation of this invention have been described in its preferred embodiment. However, it should be noted that this invention may be practiced otherwise than as specifically illustrated and described without departing from its scope. For example, modifications to the invention can include, but are not limited to, modifying the shape of the spring, retainer, bushings, and visor arm.

What is claimed is:

1. A sliding visor assembly for a vehicle, the visor assembly comprising:
    a visor body including a first half and a second half connected to said first half by a hinge portion, an inner surface of one of said first half and said second half of said visor body defining a first frictional engagement surface;
    a visor arm having first and second ends, said first end attachable to a portion of the vehicle;
    a detent clip disposed about said second end of said visor arm; and
    a detent member receiving said detent clip and having an outer surface defining a second frictional engagement surface, wherein said second frictional engagement surface is selectively engaged with said first frictional engagement surface said detent member including at least one outwardly extending resilient finger in frictional engagement with said visor body, wherein said resilient finger exerts a force against said visor body, and wherein in a final sliding visor assembly, said first half and said second half of said visor body are folded about said hinge portion, wherein said detent member is disposed therebetween.

2. The visor assembly according to claim 1, wherein rotational movement of said visor body about said visor arm causes said visor body to move between a stowed position and a deployed position, said detent clip providing a clamping force on said visor arm when said visor body is in the stowed position and when said visor body is in the deployed position.

3. The visor assembly according to claim 1, wherein longitudinal movement of said visor body relative to said visor arm causes said visor body to move between a retracted position and an extended position, said second frictional engagement surface frictionally engaging said first frictional engagement surface.

4. The visor assembly according to claim 1, wherein said second frictional engagement surface of said detent member engages said first frictional engagement surface of said visor body, said detent member being slidably movable relative to said visor body.

5. The visor assembly according to claim 1, wherein said first engagement surface of said visor body defines a slide path, said detent member being disposed within said slide path and slidably movable relative to said visor body.

6. The visor assembly according to claim 1, wherein said first frictional engagement surface defines a track extending outwardly from the inner surface of said visor body, and said second frictional engagement surface defines a channel, said track frictionally engaging said channel.

7. The visor assembly according to claim 1, wherein said first frictional engagement surface includes a hook defining a rib channel, said hook extending outwardly from the inner surface of said visor body, and a rib extending outwardly from said second frictional engagement surface, said rib frictionally engaging said hook.

8. The visor assembly according to claim 7, wherein said visor body includes a first half and a second half, said detent member exerting a force on said first half and said second half of said visor body such that the force exerted on said visor body is distributed between said first half and said second half of said visor body.

9. The visor assembly according to claim 1, wherein said detent clip includes a first portion, a second portion, and a third portion, said first portion engaging said detent member, said second portion engaging said third portion, such that said second and third portions are coupled to one another.

10. The visor assembly according to claim 9, wherein said detent clip defines a detent spring.

11. The visor assembly according to claim 1, wherein said visor arm includes a recessed detent portion at said second end thereof.

12. The visor assembly according to claim 11, wherein said recessed detent portion of said visor arm engages said detent clip when said visor body in the first position.

13. The visor assembly according to claim 1, wherein said detent member includes a body having a visor arm receiving portion and a detent clip receiving portion.

14. The visor assembly according to claim 11, wherein said recessed detent portion of said visor arm is substantially flat.

15. A sliding visor assembly for a vehicle, the visor assembly comprising:
    a visor body, an inner surface of said visor body defining a first frictional engagement surface;
    a visor arm having first and second ends, said first end attachable to a portion of the vehicle;
    a detent clip disposed about said second end of said visor arm; and
    a detent member receiving said detent clip and having an outer surface defining a second frictional engagement surface, wherein said second frictional engagement surface is selectively engaged with said first frictional engagement surface,
    wherein said first frictional engagement surface includes a hook defining a rib channel, said hook extending outwardly from the inner surface of said visor body, and a rib extending outwardly from said second frictional engagement surface, said rib frictionally engaging said hook.

16. The visor assembly according to claim 15, wherein said visor body includes a first half and a second half, said detent member exerting a force on said first half and said second half of said visor body such that the force exerted on said visor body is distributed between said first half and said second half of said visor body.

17. The visor assembly according to claim 15, wherein said detent member includes a detent body having a visor arm receiving portion and a detent clip receiving portion, and wherein said detent body includes an outwardly extending finger in frictional, engagement with said first frictional engagement surface of said visor body.

18. A sliding visor assembly for a vehicle, the visor assembly comprising:

a visor body including a first half and a second half connected to said first half by a hinge portion, an inner surface of one of said first half and said second half of said visor body defining a first frictional engagement surface;

a visor arm having first and second ends, said first end attachable to a portion of the vehicle;

a detent clip disposed about said second end of said visor arm; and a detent member receiving said detent clip and having an outer surface defining a second frictional engagement surface, wherein said second frictional engagement surface is selectively engaged with said first frictional engagement surface, such that in a final sliding visor assembly, said first half and said second half of said visor body are folded about said hinge portion, wherein said detent member is disposed therebetween;

wherein said first frictional engagement surface includes a hook defining a rib channel, said hook extending outwardly from the inner surface of said visor body, and a rib extending outwardly from said second frictional engagement surface, said rib frictionally engaging said hook.

* * * * *